(12) United States Patent
Delehouze et al.

(10) Patent No.: US 10,479,049 B2
(45) Date of Patent: Nov. 19, 2019

(54) PART MADE FROM COMPOSITE MATERIAL, COMPRISING A REINFORCEMENT AGAINST DELAMINATION, AND PRODUCTION METHOD THEREOF

(71) Applicant: Safran Nacelles, Gonfreville l'Orcher (FR)

(72) Inventors: Arnaud Delehouze, Gonfreville l'Orcher (FR); Etienne Germain, Gonfreville l'Orcher (FR); Sébastien Louchard, Gonfreville l'Orcher (FR); Benjamin Provost, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 15/974,714

(22) Filed: May 9, 2018

(65) Prior Publication Data

US 2018/0257338 A1    Sep. 13, 2018

Related U.S. Application Data

(63) Continuation of application No. PCT/FR2016/052902, filed on Nov. 9, 2016.

(30) Foreign Application Priority Data

Nov. 9, 2015 (FR) ..................... 15 60702

(51) Int. Cl.
*B32B 7/04* (2019.01)
*B32B 7/08* (2019.01)
(Continued)

(52) U.S. Cl.
CPC ............. *B32B 7/08* (2013.01); *B29C 64/165* (2017.08); *B29C 70/543* (2013.01); *B32B 1/00* (2013.01);
(Continued)

(58) Field of Classification Search
CPC ... Y10T 428/24174; Y10T 428/249923; B29C 65/564; B32B 7/04
See application file for complete search history.

(56) References Cited

U.S. PATENT DOCUMENTS

| | | |
|---|---|---|
| 4,113,910 A | 9/1978 | Loyd |
| 5,789,061 A | 8/1998 | Campbell et al. |
| 5,876,540 A | 3/1999 | Pannell |

FOREIGN PATENT DOCUMENTS

| | | |
|---|---|---|
| EP | 2540479 | 1/2013 |
| EP | 2808156 | 12/2014 |
| FR | 2993492 | 1/2014 |

OTHER PUBLICATIONS

International Search Report for international application PCT/FR2016/052902, dated Mar. 27, 2017.

*Primary Examiner* — Alexander S Thomas
(74) *Attorney, Agent, or Firm* — Burris Law, PLLC

(57) ABSTRACT

The present disclosure relates to a part made from composite material that includes a base and a T-shaped reinforcement. The T-shaped reinforcement includes a first L-shaped element having a first right-angled connection portion and a second L-shaped element having a second right-angled connection portion. The part further includes a plurality of needles, each connecting the base to the T-shaped reinforcement of the part, close to the connection portions and extending in multiple directions so as to oppose, in particular, the separation of the base from the T-shaped reinforcement.

6 Claims, 1 Drawing Sheet

(51) Int. Cl.
  *B29C 70/54*   (2006.01)
  *B32B 7/02*    (2019.01)
  *B32B 27/06*   (2006.01)
  *B29C 64/165*  (2017.01)
  *B32B 1/00*    (2006.01)
  *B32B 27/12*   (2006.01)
  *B29C 65/56*   (2006.01)
  *B29K 307/04*  (2006.01)
  *B29L 31/00*   (2006.01)
  *B29L 31/30*   (2006.01)

(52) U.S. Cl.
  CPC .................. *B32B 7/02* (2013.01); *B32B 7/04* (2013.01); *B32B 27/06* (2013.01); *B32B 27/12* (2013.01); *B29C 65/564* (2013.01); *B29K 2307/04* (2013.01); *B29L 2031/003* (2013.01); *B29L 2031/3076* (2013.01); *B32B 2307/514* (2013.01); *B32B 2307/54* (2013.01); *B32B 2307/558* (2013.01); *B32B 2605/00* (2013.01); *B32B 2605/18* (2013.01); *Y10T 428/24174* (2015.01); *Y10T 428/249923* (2015.04)

PART MADE FROM COMPOSITE MATERIAL, COMPRISING A REINFORCEMENT AGAINST DELAMINATION, AND PRODUCTION METHOD THEREOF

CROSS-REFERENCE TO RELATED APPLICATIONS

This application is a continuation of International Application No. PCT/FR2016/052902, filed on Nov. 9, 2016, which claims priority to and the benefit of FR 15/60702 filed on Nov. 9, 2015. The disclosures of the above applications are incorporated herein by reference.

FIELD

The present disclosure relates to a composite material workpiece which includes a reinforcement against the delamination of the workpiece. The present disclosure also concerns a manufacturing process of such a composite workpiece.

BACKGROUND

The statements in this section merely provide background information related to the present disclosure and may not constitute prior art.

In general, the present patent application concerns the field of the manufacture of composite material workpieces with stiffeners, in particular for aeronautics.

For reasons of mass and cost gains, it is interesting to replace metal parts with composite parts, in particular structural parts with complex geometry.

Most of the composite workpieces are manufactured from a fibrous reinforcement stack, frequently called "plies," for example carbon fibers or glass fibers, which are subsequently injected with resin, this resin being generally polymerized by temperature rise.

This technology is generally satisfactory for stressed monolithic workpieces according to their plane, but may prove unsuitable for "out-of-plane" stressed structures.

Thus, it is known to equip some workpieces with a stiffener of T-shaped section for example, which is positioned perpendicularly, or at a certain angle, to the main plane of the workpiece.

The stiffener is generally formed by a first L-shaped member and a second L-shaped composite material member which are arranged back-to-back to form a T.

More particularly, each stiffener includes a base which is extended on the soleplate of the workpiece, and a rib which extends from the associated base to form the web of the stiffener.

The rib and the base of each L-shaped member are connected by a bent connecting portion.

The junction area of the L-shaped members and the soleplate of the workpiece, in the vicinity of the connecting portions of the L-shaped members, generally delimits a cavity which is filled with resin, or else which forms a disturbance of the flatness of the plies which tend to close this cavity.

This junction area may constitute a mechanical weakening which may cause an unfolding of the plies of the connecting portion of the L-shaped members and a delamination of the plies between each member L and the soleplate of the workpiece.

Indeed, the composite workpiece may be subject, among other things, to forces collinear with the direction of the web formed by the ribs of the L-shaped members.

This type of stress may cause unfolding of the bent connecting portions of the L-shaped members, resulting in a premature delamination of the workpiece.

The presence of this first damage at relatively low forces reduces the use of the workpiece in structural areas.

In order to reinforce the workpiece, it is known to make seams to bond the plies to each other, in particular to bond the L-shaped members on the soleplate of the workpiece. This type of process and workpiece is for example described in the documents FR-A-2993492 and EP-A-2540479.

Such seams allow reinforcing the workpiece but are not entirely satisfactory.

Indeed, it is observed that the tension of the thread, especially in the junction area of the bent connecting portions of the L-shaped members and the soleplate of the workpiece, is not sufficient to take over the unfolding stresses.

When the threads are not sufficiently taut, it is necessary to sufficiently deform the workpiece in order to allow the thread to be tensioned and thus play its role of reinforcement.

The deformation necessary for the tensioning of the thread is often sufficient to cause cracking and other delamination detrimental to the holding of the workpiece.

SUMMARY

The present disclosure provides a composite material workpiece which includes a soleplate and a T-shaped reinforcement, the T-shaped reinforcement comprising a first L-shaped member and a second L-shaped member which are arranged back-to-back to generally form a T, the first L-shaped member and the second L-shaped member comprising:

a first base and a second base respectively, which are each extended on the soleplate of said workpiece;

a first rib and a second rib respectively which are attached back-to-back to form a web; and a first connecting portion and a second connecting portion respectively which connect said ribs on said associated bases.

The composite material workpiece comprises:

a plurality of needles which each connect the soleplate and the T-shaped reinforcement of said workpiece, in the vicinity of said connecting portions, and which extend in several directions to oppose in particular the spacing of the soleplate and the T-shaped reinforcement:

a core which is housed in a cavity delimited by a junction area between the soleplate, the first connecting portion and the second connecting portion, the needles passing through said core, at least one portion of the needles extending generally radially along the radius of curvature of the first connecting portion and the second connecting portion of the L-shaped members, at least another portion of the needles extending generally in the direction of the ribs of the L-shaped members, and said needles extending in a star configuration by intersecting at the center of the core and said workpiece.

The needles allow bonding fibrous plies to each other by having a taut shape, whereby the needles oppose the unfolding of the plies and the deformation of the workpiece from the first moments of mechanical stress.

Indeed, the needles which are stiff, do not have to be drawn tight to be capable of matching mechanical forces, unlike the threads used in the prior art.

The core allows inhibiting the resin concentration in the cavity formed by the L-shaped members and the soleplate and also inhibits the expansion of the fibrous plies at this location.

Furthermore, the core promotes the fastening of the needles.

The needles allow efficiently bonding the connecting portions of the L-shaped members on the soleplate and the core.

The other portion of the needles extending generally in the direction of the ribs of the L-shaped members allows bonding the ribs on the soleplate.

According to one form, the needles are formed by pultruded threads.

This type of thread offers the advantage of having a shape which is held taut.

Furthermore, the pultruded threads are made of a material of the same or similar nature as the composite workpiece, for example resin impregnated carbon fibers.

According to another feature, the core is deformable to substantially match the shape of the L-shaped members.

This feature allows avoiding the resin pockets in the cavity delimited by the L-shaped members.

The present disclosure also concerns a manufacturing process of a composite material workpiece of the previously described type, characterized in that it includes at least:

one deposition step of the first L-shaped member and the second L-shaped member in a mold;
one deposition step of the core; and
one deposition step of the soleplate which includes trapping the core.

In one form, the deposition step of the core comprises inserting the needles through the core then inserting the core into the cavity delimited by a junction area between the first connecting portion and the second connecting portion of said L-shaped members.

Also, the process includes a compaction step of the workpiece which comprises pressing the L-shaped members, the soleplate and the core together, for penetrating the needles through the L-shaped members and the soleplate.

Finally, the process includes a molding step of the workpiece which is carried out subsequent to the compaction step and which comprises molding the workpiece and injecting resin into the workpiece.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
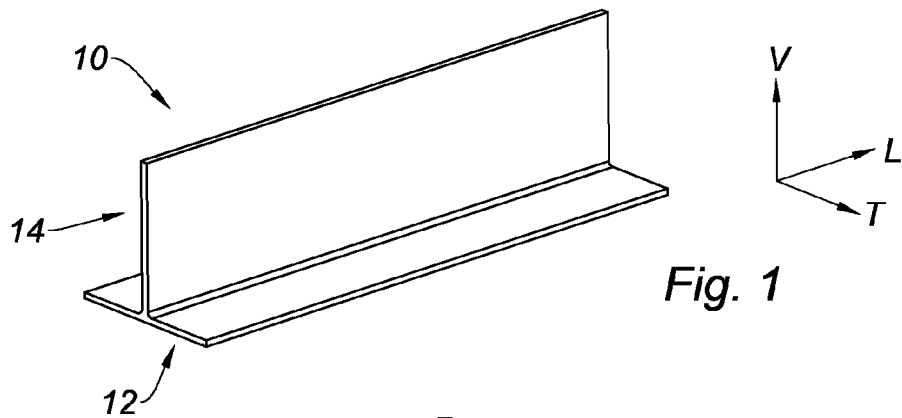
FIG. 1 is a perspective view which illustrates a composite workpiece according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, the terminology longitudinal, vertical and transverse will be adopted without limitation with reference to the trihedron L, V, T indicated in the figures.

FIG. 1 shows a composite material workpiece 10 which includes a soleplate 12 and a T-shaped reinforcement 14, the soleplate 12 and the T-shaped reinforcement 14 being each made of fibrous plies impregnated with resin.

The soleplate 12 has a horizontal flat shape which extends in a longitudinal direction.

The T-shaped reinforcement 14 comprises a first L-shaped member 16a and a second L-shaped member 16b which are arranged back-to-back to generally form a T.

Figure 2:
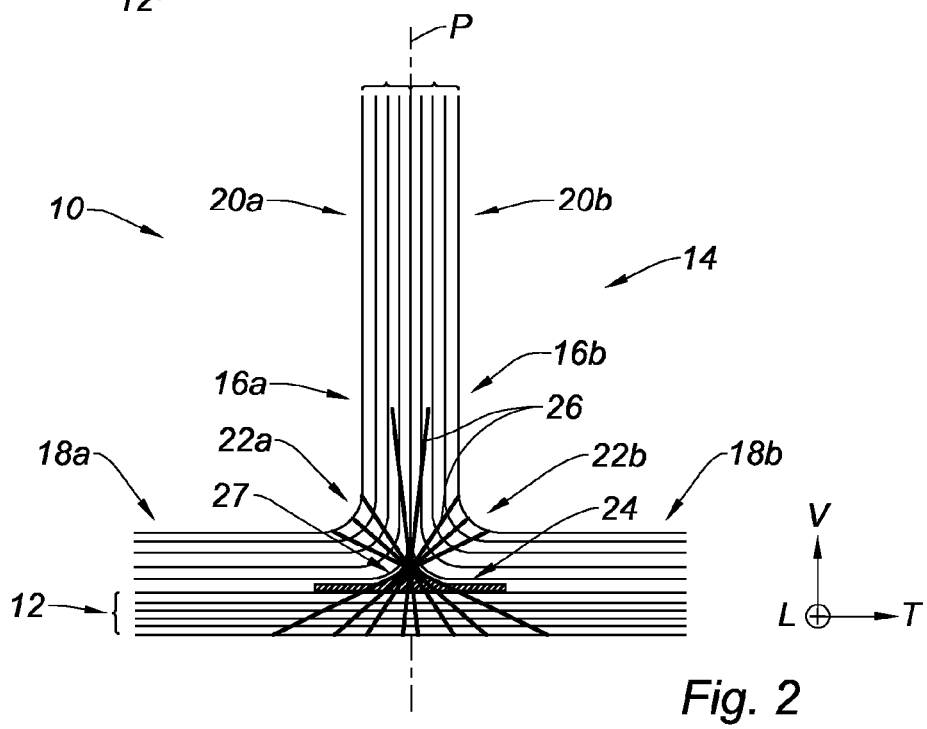
FIG. 2 is a schematic cross-sectional view which illustrates a central core and reinforcement needles bonding plies of the composite workpiece of FIG. 1.

The workpiece 10 has a symmetrical design along a vertical and longitudinal plane of symmetry P shown in FIG. 2.

In order to facilitate the understanding of the description, the identical and symmetrical members along the plane of symmetry P are indicated by the same numerical references distinguished by the letters "a" or "b."

The first L-shaped member 16a and the second L-shaped member 16b comprise a first base 18a and a second base 18b respectively, which are each extended on the soleplate 12 of the workpiece 10.

Also, the first L-shaped member 16a and the second L-shaped member 16b include a first rib 20a and a second rib 20b, respectively, which are attached back-to-back to form a reinforcement core.

Furthermore, the first rib 20a and the second rib 20b are connected on their respective base 18a, 18b by a first bent connecting portion 22a and a second bent connecting portion 22b respectively.

It will be noted that the angle formed between the ribs 20a, 20b and their associated base 18a, 18b is a right angle.

However, without limitation, the ribs 20a, 20b may be more or less inclined relative to the associated base 18a, 18b.

Figure 3:
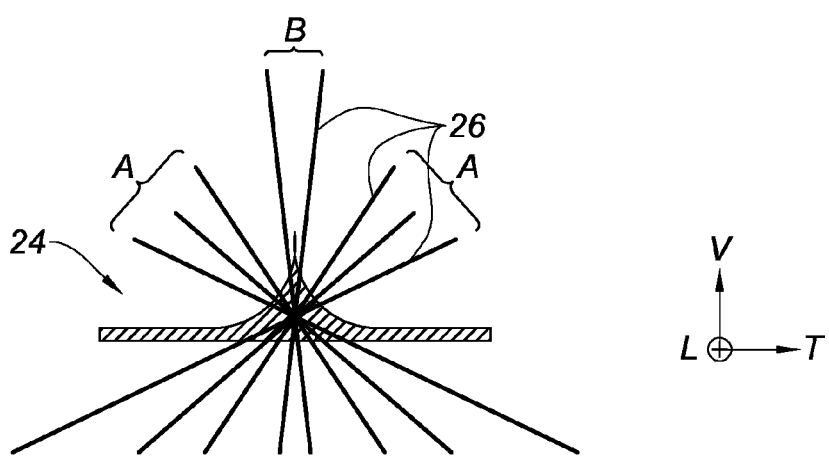
FIG. 3 is a detailed schematic cross-sectional view which illustrates the central core and the reinforcement needles of FIG. 2.

As shown in detail in FIG. 3, the workpiece 10 includes a core 24, also called nail heading, which is housed in a cavity 27 delimited by a junction area between the soleplate 12, the first connecting portion 22a and the second connecting portion 22b.

The core 24 is constituted by a set of fibers held together, the core 24 being designed to cover areas without fibers, avoid the resins pockets and provide the non-expansion of the plies in this junction area.

To this end, the core 24 is deformable to match the generally triangular shape drawn by the bent connecting portions 22a, 22b.

According to another feature, the workpiece 10 comprises a plurality of needles 26 each of which connects the soleplate 12 to the T-shaped reinforcement 14 of the workpiece 10, in the vicinity of the connecting portions 22a, 22b.

As used herein, the term "needles" 26 shall be construed to mean any fine member capable of being held taut, unlike a loose thread.

In one form, the needles 26 are made of a material compatible with the materials used to manufacture the workpiece 10 and the core 24, such as a composite material.

According to one form, the needles 26 are a pultruded thread, that is to say a thread obtained by a pultrusion process, and which includes the same or similar type of fibers as the fibers used to make the plies of the core 24 and the rest of the workpiece 10. This type of fiber is for example carbon fibers.

It will be noted that the needles 26 pass throughout the core 24.

With reference to FIG. 3, the needles 26 extend in several directions to oppose in particular the spacing of the soleplate 12 and the T-shaped reinforcement 14.

More particularly, the needles 26 extend in a star configuration as shown by intersecting at the center of the core 24 and the workpiece 10.

A first group A of needles includes needles 26 which extend generally radially along the radius of curvature of the first connecting portion 22a and the second connecting portion 22b of the L-shaped members 16a, 16b.

The needles 26 of the first group A extend from the first connecting portion 22a and the second connecting portion 22b, to the soleplate 12 of the workpiece 10, by passing through the core 24.

A second group B of needles includes needles 26 which extend generally vertically in the direction of the ribs 20a, 20b of the L-shaped members 16a, 16b.

The needles 26 of the second group B extend from the ribs 20a, 20b of the L-shaped members 16a, 16b, to the soleplate 12 of the workpiece 10, by passing through the core 24.

The use of needles 26 allows a good penetration to the needles 26 in the entire thickness of the workpiece 10 while maintaining their rigidity.

Thus, the needles 26 will be able to act from the first moments of mechanical stresses of the workpiece 10, to oppose in particular the unfolding of the connecting portions 22a, 22b of the L-shaped members 16a, 16b.

The workpiece 10 is made according to a process described hereinafter.

The manufacturing process according to the present disclosure includes a deposition step of the first L-shaped member 16a and the second L-shaped member 16b into a mold.

Subsequent to the deposition step, the process includes a deposition step of the core 24 which comprises inserting the needles 26 through the core 24 then inserting the assembly formed by the core 24 and the needles 26 in the hollow formed by the connecting portions 22a, 22b of the L-shaped members 16a, 16b.

Without limitation, this deposition step of the core 24 may be carried out differently, by inserting the core 24 into the hollow formed by the connecting portions 22a, 22b of the L-shaped members 16a, 16b then by inserting the needles 26 through the core accordingly positioned.

The process also includes a deposition step of the soleplate 12 which comprises extending the soleplate 12 on the base 18a, 18b of the L-shaped members 16a, 16b so as to trap the core 24.

Subsequently to the deposition step of the soleplate 12, the process includes a compaction step of the workpiece 10 which comprises pressing the L-shaped members 16a, 16b, the soleplate 12 and the core 24 together, in order to finish penetrating the needles 26 through the L-shaped members 16a, 16b and the soleplate 12.

Finally, the process includes a molding step of the workpiece 10 which is carried out subsequent to the compaction step and which comprises molding the workpiece 10 and injecting resin into the workpiece 10 through the fibrous plies.

The present description of the present disclosure is given by way of non-limiting example.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A composite material workpiece comprising:
   a soleplate;
   a T-shaped reinforcement comprising a first L-shaped member and a second L-shaped member arranged back-to-back to form a T, wherein the first L-shaped member includes a first base and the second L-shaped member includes a second base, the first and second bases each extending on the soleplate, wherein the first L-shaped member includes a first rib and the second L-shaped member includes a second rib, the first and second ribs attached back-to-back to form a web, wherein the first L-shaped member includes a first connecting portion and the second L-shaped member includes a second connecting portion that connects said ribs on said first and second bases;
   a plurality of needles connecting the soleplate on the T-shaped reinforcement in a vicinity of said first and second connecting portions, and extending in several directions through the soleplate and the T-shaped reinforcement; and
   a core housed in a cavity delimited by a junction area between the soleplate, the first connecting portion, and the second connecting portion, wherein
   the plurality of needles pass through said core,
   at least one portion of the plurality of needles extends radially along a radius of curvature of the first connecting portion and the second connecting portion,
   at least another portion of the plurality of needles extends in a direction of the first and second ribs, and
   the plurality of needles extend in a star configuration by intersecting at a center of the core and said workpiece.

2. The composite material workpiece according to claim 1, wherein the needles are formed by pultruded threads.

3. The composite material workpiece according to claim 1, wherein the core is deformable to substantially match a shape of the L-shaped members.

4. A manufacturing process of a composite material workpiece according to claim 1, the manufacturing process comprising:
   one deposition step of the first L-shaped member and the second L-shaped member into a mold,
   one deposition step of the core,
   one deposition step of the soleplate which results in trapping the core, and
   one compaction step of the workpiece which presses the L-shaped members, the soleplate and the core together, to penetrate the needles through the L-shaped members and the soleplate.

5. The manufacturing process of a composite material workpiece according to claim 4, wherein the deposition step of the core comprises:
   inserting the needles through the core then inserting the core into the cavity delimited by a junction area between the first connecting portion and the second connecting portion of said L-shaped members.

6. The manufacturing process of a composite material workpiece according claim 4 further comprising:
   a molding step of the workpiece which is carried out following the compaction step and which includes molding the workpiece and injecting resin into the workpiece.

\* \* \* \* \*